United States Patent
Serkh

(10) Patent No.: US 6,592,482 B2
(45) Date of Patent: Jul. 15, 2003

(54) TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/029,056

(22) Filed: Oct. 22, 2001

(65) Prior Publication Data

US 2003/0078124 A1 Apr. 24, 2003

(51) Int. Cl.[7] .......................... F16H 7/18; F16H 55/52; F16D 41/04; F16D 47/00
(52) U.S. Cl. ................. 474/135; 192/48.92; 192/48.3; 192/45
(58) Field of Search ................. 474/112, 135, 474/136, 138; 192/48.92, 48.3, 45

(56) References Cited

U.S. PATENT DOCUMENTS

| 3,988,007 A | | 10/1976 | Freiburger, Jr. ............... 254/164 |
| 4,285,676 A | * | 8/1981 | Kraft .......................... 474/135 |
| 4,472,162 A | | 9/1984 | Hitchcock .................... 474/135 |
| 4,583,962 A | | 4/1986 | Bytzek et al. ................ 474/133 |
| 4,725,260 A | | 2/1988 | Komorowski et al. ....... 474/135 |
| 4,822,322 A | | 4/1989 | Martin ........................ 474/135 |
| 4,824,421 A | * | 4/1989 | Komorowski ................ 474/135 |
| 4,834,694 A | | 5/1989 | Martin ........................ 474/135 |
| 4,923,435 A | | 5/1990 | Kadota et al. ............... 474/112 |
| 5,021,032 A | * | 6/1991 | Macchiarulo et al. ....... 474/135 |
| 5,073,148 A | * | 12/1991 | Dec ............................. 474/135 |
| RE34,616 E | | 5/1994 | Komorowskip et al. .... 474/135 |
| 5,878,855 A | | 3/1999 | Miyata ....................... 192/41 R |
| 6,024,196 A | | 2/2000 | Miyata ....................... 192/41 R |
| 6,035,985 A | | 3/2000 | Miyata ....................... 192/41 R |
| 6,220,414 B1 | | 4/2001 | Nagaya et al. .............. 192/45.1 |
| 6,231,465 B1 | * | 5/2001 | Quintus ...................... 474/135 |
| 6,234,928 B1 | | 5/2001 | Suzuki et al. ............... 474/109 |
| 6,264,578 B1 | * | 7/2001 | Ayukawa .................... 474/135 |
| 6,416,435 B1 | * | 7/2002 | Szatkowski et al. ........ 474/135 |
| 2002/0025869 A1 | * | 2/2002 | Serkh et al. ................. 474/135 |

FOREIGN PATENT DOCUMENTS

| DE | 3714645 A1 | 11/1988 | ............. F16H/7/08 |
| DE | 3718227 A1 | 12/1988 | ............. F16H/7/08 |
| DE | 3824645 A1 | 1/1990 | ............. F16H/7/08 |
| DE | 3929753 C1 | 10/1991 | ............. F16H/7/08 |
| JP | 05257895 | 10/1993 | ............. F16H/7/12 |

* cited by examiner

Primary Examiner—Thomas R. Hannon
Assistant Examiner—Bradley J. Van Pelt
(74) Attorney, Agent, or Firm—J. A. Thurnau, Esq.; C. H. Castleman, Esq.; S. G. Austin, Esq.

(57) ABSTRACT

A belt tensioner having a pivot arm biased toward a belt by a torsion spring. The tensioner also comprises a one-way clutch coupled with a friction clutch. The pivot arm of the tensioner is connected to a one-way clutch. The one-way clutch is cooperatively connected to a friction clutch having a predetermined friction torque caused by frictionally engaged radially extending surfaces. The pivot arm may move relatively freely toward a belt by operation of the one-way clutch. At the limit of arm movement the one-way clutch engages, preventing travel away from the belt in an opposite direction. The arm may only travel away from the belt when a belt tension torque exceeds the spring force plus a friction torque of the friction clutch.

15 Claims, 3 Drawing Sheets

TENSIONER

FIELD OF THE INVENTION

The invention relates to tensioners, more particularly to tensioners having asymmetric damping achieved by use of a one-way clutch coupled with a friction clutch.

BACKGROUND OF THE INVENTION

Most engines used for automobiles and the like include a number of belt driven accessory systems which are necessary for the proper operation of the vehicle. The accessory systems may include an alternator, air conditioner compressor and a power steering pump.

The accessory systems are generally mounted on a front surface of the engine. Each accessory would have a pulley mounted on a shaft for receiving power from some form of belt drive. In early systems, each accessory was driven by a separate belt that ran between the accessory and the crankshaft. With improvements in belt technology, single serpentine belts are -now used in most applications. Accessories are driven by a single serpentine belt routed among the various accessory components. The serpentine belt is driven by the engine crankshaft.

Since the serpentine belt must be routed to all accessories, it has generally become longer than its predecessors. To operate properly, the belt is installed with a pre-determined tension. As it operates, it stretches slightly. This results in a decrease in belt tension, which may cause the belt to slip. Consequently, a belt tensioner is used to maintain the proper belt tension as the belt stretches during use.

As a belt tensioner operates, the running belt may excite oscillations in the tensioner spring. These oscillations are undesirable, as they cause premature wear of the belt and tensioner. Therefore, a damping mechanism is added to the tensioner to damp the oscillations.

Various damping mechanisms have been developed. They include viscous fluid based dampers, mechanisms based on frictional surfaces sliding or interaction with each other, and dampers having interacting springs. The art also comprises lock center devices that allow a pivot arm to move only in a single direction.

Representative of the art is JP07113446A to Bando which discloses a tensioner having a one-way clutch on an immoveable portion which regulates a movement of a moveable portion.

Also representative of the art is U.S. Pat. No. 4,583,962 (1986) to Bytzek et al. which discloses a tensioning device having a damping system for damping the operating movements by a one-way clutch mechanism.

What is needed is a tensioner having asymmetric damping using a one-way clutch coupled with a friction clutch. What is needed is a tensioner having a one-way clutch coupled with a friction clutch having radially extending surfaces. The present invention meets these needs.

SUMMARY OF THE INVENTION

The primary aspect of the invention is to provide a tensioner having asymmetric damping using a one-way clutch coupled with a friction clutch.

Another aspect of the invention is to provide a tensioner having a one-way clutch coupled with a friction clutch having radially extending surfaces.

Other aspects of the invention will be pointed out or made obvious by the following description of the invention and the accompanying drawings.

The invention comprises a belt tensioner having a pivot arm biased toward a belt by a torsion spring. The tensioner also comprises a one-way clutch coupled with a friction clutch. The pivot arm of the tensioner is connected to a one-way clutch. The one-way clutch is cooperatively connected to a friction clutch having a predetermined friction torque caused by frictionally engaged radially extending surfaces. The pivot arm may move relatively freely toward a belt by operation of the one-way clutch. At the limit of arm movement the one-way clutch engages, preventing travel away from the belt in an opposite direction. The arm may only travel away from the belt when a belt tension torque exceeds the spring force plus a friction torque of the friction clutch.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
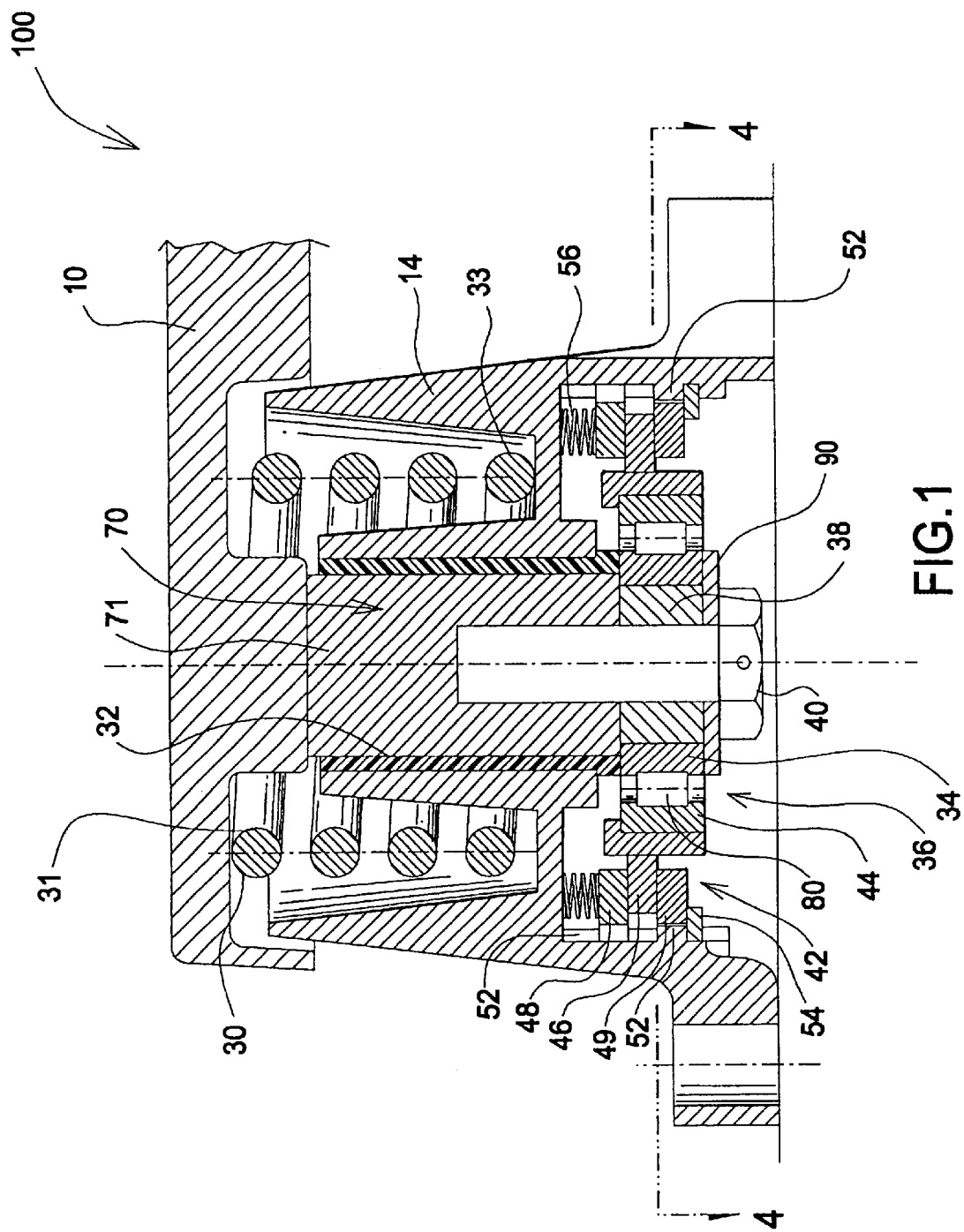
FIG. 1 is a cross-sectional elevation view of the inventive tensioner.

FIG. 1 is a cross-sectional elevation view of the inventive tensioner. The tensioner may be used on front end accessory belt drives for vehicle engines. The tensioner maintains a belt tension by applying a spring force to a belt through a pivot arm. The tensioner also damps movements of the pivot arm by operation of a one-way clutch coupled with a friction clutch.

Figure 2:
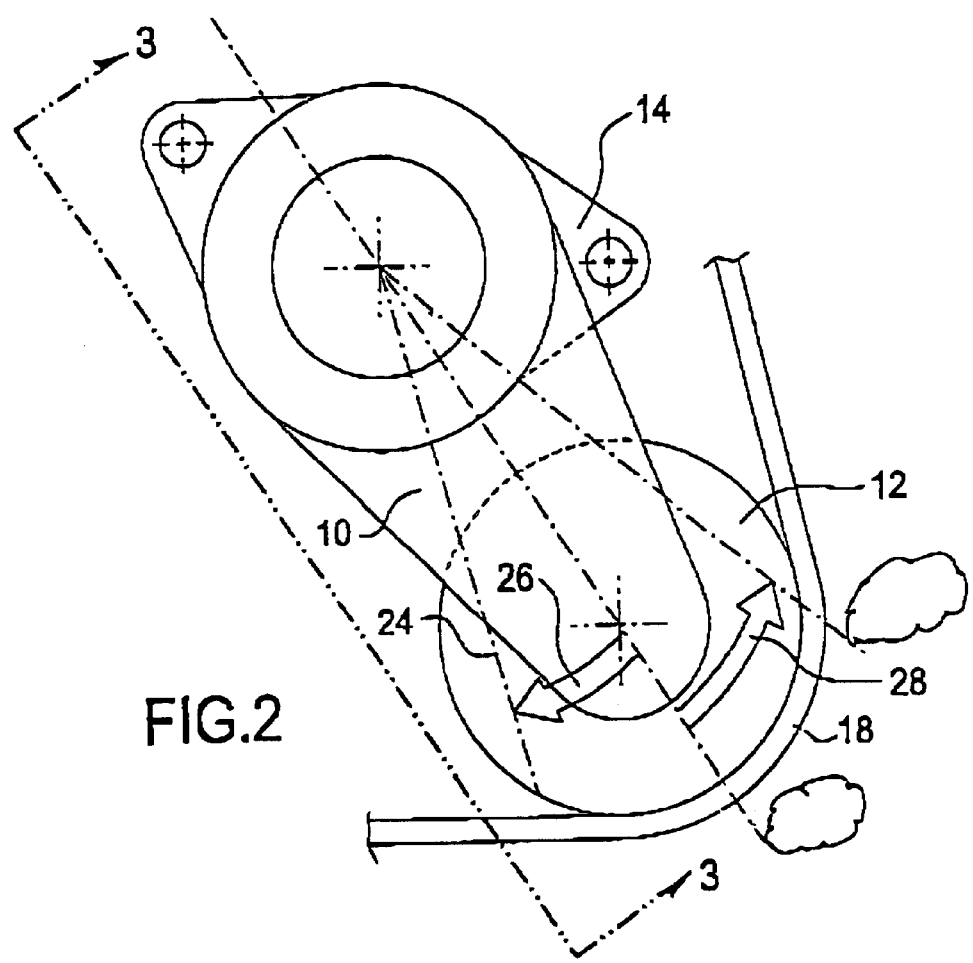
FIG. 2 is a plan view schematic of the operation of the inventive tensioner.

Tensioner 100 comprises pivot arm 10, base 14 and pulley 12 (not shown, see FIG. 2). Base 14 comprises a pivot arm receiving portion 70 for receiving a pivot arm post 71 portion. First biasing member or torsion spring 30 has an end 31 which is engaged with pivot arm 10 and another end 33 engaged with base 14. Spring 30 biases pivot arm 10 in a direction of rotation as against base 14. Arm 10 is journaled to base 14 in receiving portion 70 using anti-friction sleeve bearing 32. Receiving portion 70 describes a circular hole in base 14. Bearing 32 may comprise any friction reducing material known in the art including lubricated materials, plastics, phenolics, PTFE and so on.

The inventive tensioner comprises one-way clutch 36. One-way clutch 36 comprises first portion or inner race 34 and second portion or outer race 44. Inner race 34 of one-way clutch 36 is attached to arm post 38 by fastener or bolt 40. Bolt 40 bears upon washer 90 affixing inner race 34 to post 71.

Inner race 34 is immovable in a predetermined direction with respect to outer race 44 by operation of a clutch mechanism having a rod 80 engaged between inner race 34 and an inner surface 82 of outer race 44. Rod 80 allows movement in a first rotational direction by pressing the rod against spring 81 which allows rod 80 to move sufficiently to allow rotation of inner race 34 within outer race 44, see FIG. 4. When inner race 34 is moved in an opposite direction by an opposite movement of arm 10, rod 80 is pressed, or wedged, between inner race 34 and outer race 44 locking inner race 34 with respect to outer race 44 thereby preventing rotational movement of the clutch absent movement of the friction clutch 42 as described elsewhere in this specification. Thus, the mechanism only allows the inner race to move or rotate in a single direction with respect to the outer race. One can appreciate that one-way clutch 36 may also comprise a plurality of rods 80 and springs 81 while operating in the manner described herein for FIG. 4.

Friction clutch 42 is connected to outer race 44 of one-way clutch 36 and to base 14. Friction clutch 42 comprises inner plate 46 which is attached to outer race 44 of one-way clutch 36. Outer plates 48 and 49 are engaged with base 14 through key-ways 52. Plates 48, 49 cannot rotate about base 14 and are limited to a sliding, axial travel by operation of the key-ways. Consequently, plates 48, 49 move in a direction that is parallel to an axis of rotation of the pivot arm, thereby engaging plate 46 between them. Plates 48, 49 are held in place in base 14 by retaining ring 54. Plates 46, 48, and 49 generally comprise planar surfaces, but may have any form affording the desired frictional torque.

A friction torque is caused by radially extending plates 48 and 49 that are each frictionally engaged with opposing surfaces of plate 46. The frictionally engaged surfaces each have a coefficient of friction. Plate 46 is contained between plates 48, 49. Spring 56 acting with retaining ring 54 presses plates 48 and 49 together against plate 46. The friction torque is a function of the engaged surface area of plates 48 and 49 with plate 46 and of a spring rate of spring 56. One can appreciate that the friction torque can be adjusted based upon changing the plate engagement area of plates 48, 49, 46 or by changing a spring rate of spring 56, or by changing a coefficient of friction of the plates, or by changing the number of plates, or by any combination of the foregoing.

FIG. 2 is a plan view schematic of the operation of the inventive tensioner. Belt 18 engages pulley 12. Upon application of a belt load pivot arm 14 moves in direction 28, during which movement the one-way clutch is unlocked. Movement of pivot arm 10 in direction 28 is the result of a decrease in belt tension which allows spring 30 to rotate pivot arm 10. Movement of pivot arm 10 in direction 28 is resisted primarily by the spring force of torsion spring 30. A first damping force in direction 28 is caused primarily by spring 30. A relatively minimal amount of damping is caused by operation of the one-way clutch. When the limit of travel in direction 28 is reached, one-way clutch inner race locks with the outer race, preventing a movement of the pivot arm in an opposite direction.

As a belt tension increases pivot arm 14 is urged to move in direction 26. As described elsewhere in this specification, movement in direction 26 is possible when the arm torque caused by a belt load exceeds a spring force of spring 30 plus a friction torque of friction clutch 42. One can appreciate that movement in direction 26 entails a significantly increased damping force caused by the operation of. the friction clutch 42. Said second damping force is greater in direction 26 than in direction 28 due to operation of the friction clutch. As a result, the asymmetric damping characteristic of the inventive tensioner is realized by the greater second damping force experienced in direction 26 as compared to the first damping force caused by a movement in direction 28. Movement of pivot arm 14 continues until pivot arm 14 reaches load position 24, which is where a spring force substantially equals a belt load.

Figure 3:
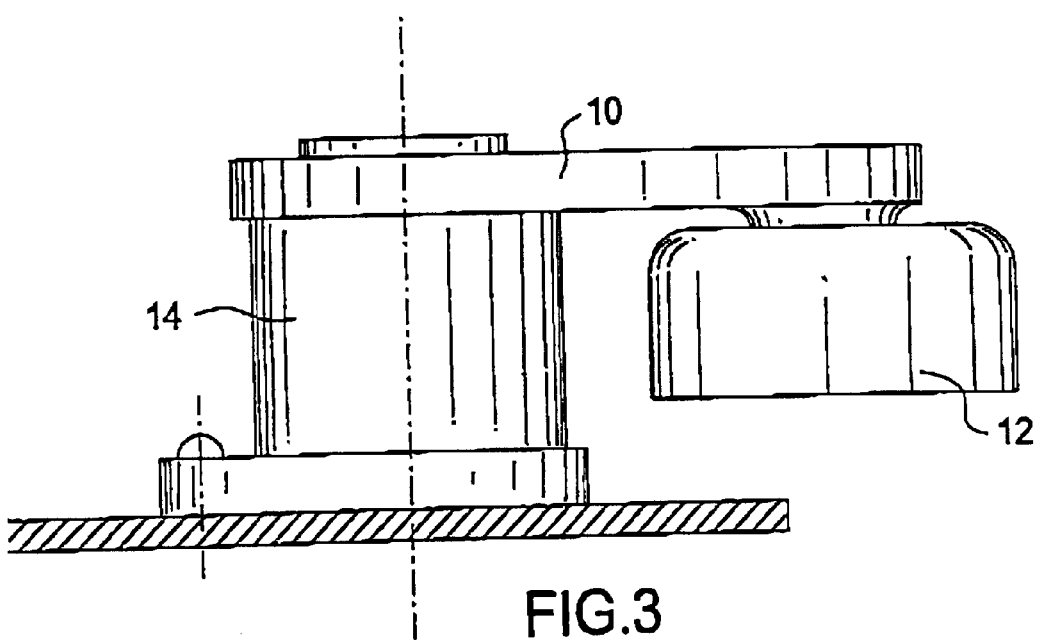
FIG. 3 is a side view of the inventive tensioner.

FIG. 3 is a side view of the inventive tensioner. Pulley 12 is journaled to pivot arm 14. A belt bearing surface for pulley 12 may comprise any profile to engage any belt known in the art, including toothed, flat and multi-ribbed.

Figure 4:
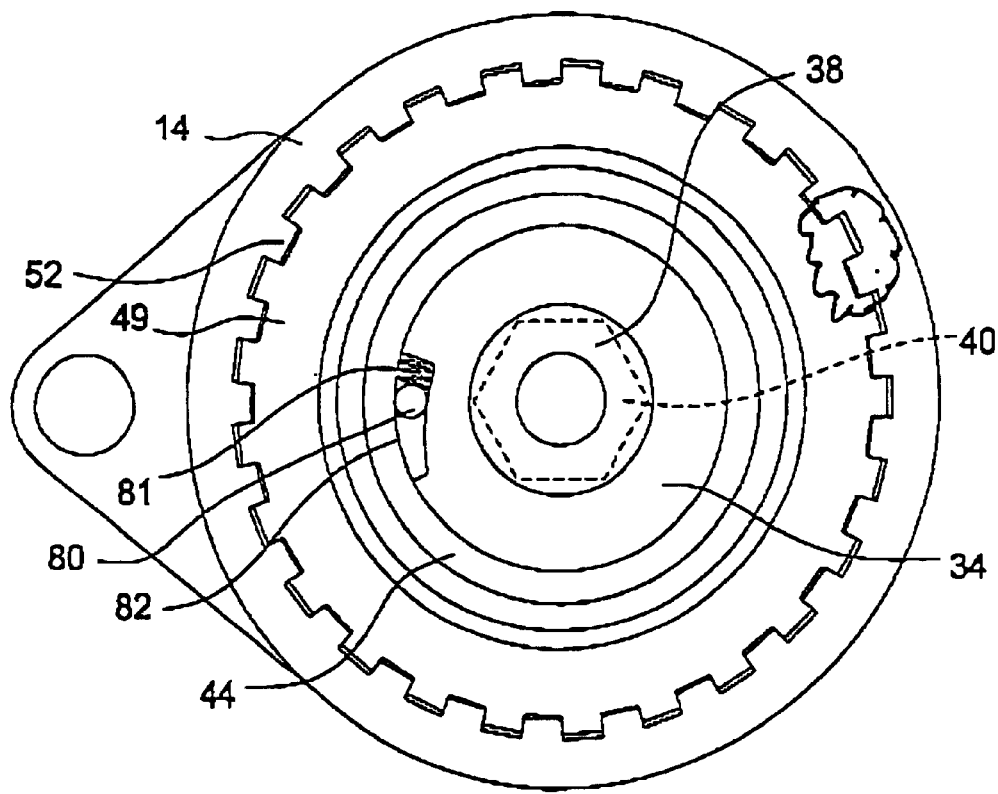
FIG. 4 is a plan view of the inventive tensioner at 4—4 in FIG. 2.

FIG. 4 is a plan view of the inventive tensioner at 4—4 in FIG. 1. Plates 48 (not shown) and 49 are engaged with base 14 by keyways 52 thereby constraining plates 48, 49 to a sliding axial movement with respect to base 14. Inner race 34 of one-way clutch 36 is engaged with arm 10 (not shown) by bolt 40. Inner plate 46 is connected with outer race 44 of one-way clutch 36. Inner plate 46 has a frictional engagement between plates 48 and 49.

Figure 5:
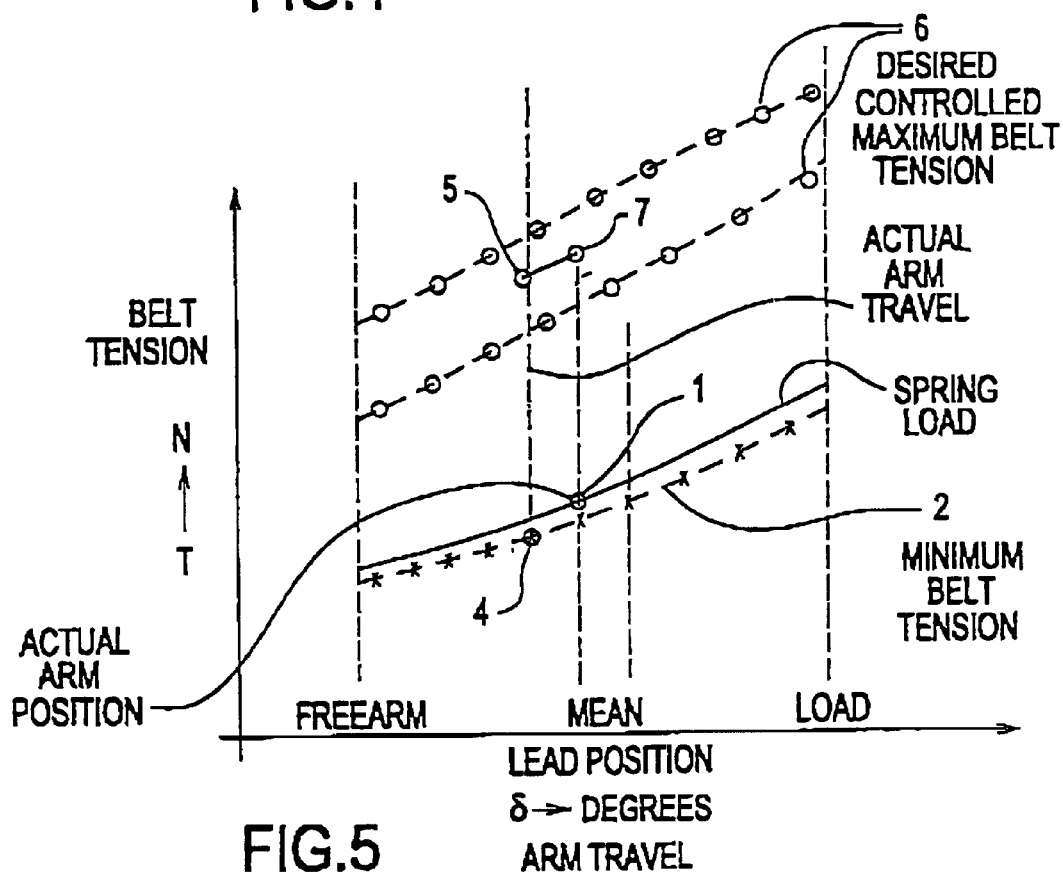
FIG. 5 is a chart depicting the belt tension versus arm travel.

FIG. 5 is a chart depicting the belt tension versus arm travel. The advantage of the inventive tensioner is that the belt tension can be controlled during operation. When a pivot arm is at position 1 and a belt tension drops below a minimum belt tension 2 the pivot arm will move through an arc δ towards a new position 4, which is in the direction of a belt. The belt will be tightened to a minimum belt tension at position 2. As a belt tension increases the pivot arm is moved in the opposite direction at which point one-way clutch 36 locks, preventing the pivot arm from returning to position 1.

Pivot arm 10 may return to position 1 if the belt tension reaches the desired controlled maximum belt tension 5, shown in FIG. 5 between an upper and lower belt tension range 6. Movement from position 5 to position 1 occurs when the torque caused by a belt tension or hub load reaches and exceeds the spring force plus the friction torque of friction clutch 42. Pivot arm 10 moves from position 5 to position 7 through an arc δ to original pivot arm position 1 when the belt tension, and thereby arm torque, increases sufficiently to overcome the spring force plus friction force in the friction clutch.

Although a single form of the invention has been described herein, it will be obvious to those skilled in the art that variations may be made in the construction and relation of parts without departing from the spirit and scope of the invention described herein.

We claim:

1. A tensioner comprising:
    a base having a receiving portion;
    a pivot arm post journaled into the receiving portion;
    a first biasing member connected to the pivot arm and base biasing the pivot arm against a belt load;
    a pulley journaled to the pivot arm;
    a one-way clutch comprising a first portion affixed to the pivot arm and a second portion;
    a member cooperatively disposed between the first portion and the second portion such that the member prevents a relative movement of the first portion and the second portion in a first rotational direction;
    a second clutch member engaged with the base and frictionally engaged with the second portion;
    the pivot arm is moveable opposite the first rotational direction by operation of the one-way clutch; and
    the pivot arm is moveable in the first rotational direction by sliding operation of the second portion and the second clutch member.

2. The tensioner as in claim 1, wherein the second clutch member further comprises:
    a plate member engaged with the base and having a movement parallel to an axis of rotation of the pivot arm.

3. The tensioner as in claim 2 further comprising:
    a second biasing member effecting a pressing engagement of the plate member with the second portion.

4. The tensioner as in claim 1 further comprising:

a first damping force opposing a pivot arm movement in a first direction;

a second damping force opposing a pivot arm movement in a second direction; and the first damping force is less than a second damping force.

5. The tensioner as in claim 3, wherein:

the first member and second member comprise planar surfaces; and the second member further comprises two planar surfaces engaged with opposing surfaces of the first member.

6. The tensioner as in claim 5, wherein:

the second biasing member comprises a spring; and the spring is engaged between the base and one of the second member planar surfaces.

7. The tensioner as in claim 1 further comprising a bearing disposed between the base and the pivot arm.

8. A tensioner comprising:

a base;

a pivot arm post journaled into the base;

a first biasing member biasing the pivot arm against a belt load;

a pulley journaled to an end of the pivot arm;

a one-way clutch engaged with the pivot arm;

a friction clutch engaged with the base and comprising a radially extending member frictionally engaged with the one-way clutch whereby a pivot arm movement is permitted in a first rotational direction by a non-locked operation of the one-way clutch;

the one-way clutch locks upon a pivot arm movement opposite the first rotational direction; and a pivot arm movement is permitted in the second direction by sliding operation of the radially extending member and the first one-way clutch.

9. The tensioner as in claim 8 further comprising:

a first planar member attached to the first one-way clutch; and the radially extending member having a frictional engagement with the first planar member.

10. The tensioner as in claim 9 further comprising:

the radially extending member comprising at least two parallel surfaces engaged with opposing sides of the first member; and a second biasing member urging the radially extending surface into pressing engagement with the first member.

11. The tensioner as in claim 8 further comprising:

a first damping force in a first movement direction;

a second damping force in a second movement direction; and the first damping force is not equal to the second damping force.

12. A tensioner comprising:

a base;

a pivot arm journaled to the base;

a spring connected between the pivot arm and the base;

a one-way clutch comprising an inner race and an outer race and a rod moveably disposed between the inner race and the outer race, the inner race connected to the pivot arm, the outer race having an inner plate connected thereto;

the inner race moveable with respect to the outer race in a first rotational direction;

the rod having a wedging engagement between the inner race and the outer race whereby the rod prevents an inner race movement in direction opposite the first rotational direction; and a friction clutch comprising a plate axially moveably engaged with the base and the plate frictionally engaged with the inner plate.

13. The tensioner as in claim 12, wherein the friction clutch further comprises a spring biasing the plate against the inner plate.

14. The tensioner as in claim 12, wherein the plate is moveably engaged with the base by a keyway.

15. The tensioner as in claim 12, whereby a rotation of the pivot arm in the direction opposite the first rotational direction is damped by a frictional engagement of the plate with the inner plate.

* * * * *